United States Patent [19]

Hemmati

[11] Patent Number: 5,568,473
[45] Date of Patent: Oct. 22, 1996

[54] METHOD AND APPARATUS FOR SIMPLE AND EFFICIENT INTERFERENCE CANCELLATION FOR CHIP SYNCHRONIZED CDMA

[75] Inventor: Farhad Hemmati, Rockville, Md.

[73] Assignee: Comsat Corporation, Bethesda, Md.

[21] Appl. No.: 354,758

[22] Filed: Dec. 8, 1994

[51] Int. Cl.[6] .................... H04B 7/216; H04J 13/04
[52] U.S. Cl. ................................ 370/18; 375/206
[58] Field of Search .................. 370/18, 20, 21, 370/19; 375/200, 205, 206, 207, 209, 210, 348; 380/34

[56] References Cited

U.S. PATENT DOCUMENTS

| | | | |
|---|---|---|---|
| 4,759,034 | 7/1988 | Nagazumi | 375/208 |
| 4,866,734 | 9/1989 | Akazawa et al. | 375/208 |
| 5,151,919 | 9/1992 | Dent | 375/205 |
| 5,291,517 | 3/1994 | Stein et al. | 375/205 |

*Primary Examiner*—Wellington Chin
*Assistant Examiner*—Chau T. Nguyen
*Attorney, Agent, or Firm*—Sughrue, Mion, Zinn, Macpeak & Seas

[57] ABSTRACT

Interference from other users in a CDMA Spread Spectrum system is cancelled by constructing a single reference sequence which is representative of the spreading sequences of all users in the system. Interference from the other users can be cancelled without each receiver employing a separate decorrelator for every other user in the system and having an accurate estimate of the received power level of every transmitted signal.

10 Claims, 10 Drawing Sheets

METHOD AND APPARATUS FOR SIMPLE AND EFFICIENT INTERFERENCE CANCELLATION FOR CHIP SYNCHRONIZED CDMA

FIELD OF THE INVENTION

The present invention is directed to an apparatus and method for cancelling interference from other users in a chip synchronous direct sequence Code Division Multiple Access (CDMA) system, and more particularly, to a system which requires only a single reference sequence to cancel interference from multiple users.

BACKGROUND OF THE INVENTION

The three major types of systems widely being employed in fixed and mobile communication systems are Frequency Division Multiple Access (FDMA), Time Division Multiple Access (TDMA) and Code Division Multiple Access (CDMA).

The oldest system, FDMA, divides the available frequency spectrum into several channels, and allocates channels to users as needed. As a result, the number of channels in an FDMA system is limited directly by the available bandwidth.

In TDMA, each user transmits over the same frequency, but the channel is divided into time slots, so that each user only transmits a portion of information at the allotted time.

While FDMA and TDMA systems keep the users from transmitting either on the same frequency or at the same time, CDMA allows all users to transmit over the same broadband frequency at the same time. In both the time domain and the frequency domain, CDMA signals appear to be on top of each other. However, before transmission, each user's signal is modulated by a unique spreading code, which increases the signal bandwidth substantially more than otherwise required for transmitting the baseband signal. At the receiver, the spreading code then is applied to the received signal to extract the desired data.

CDMA spread spectrum modulation has been proposed for several mobile terrestrial and/or satellite networks. It has been especially recommended, implemented, and field tested for cellular terrestrial systems. While it has been shown that CDMA, under special channel conditions, potentially can achieve a high bandwidth efficiency, its performance substantially and considerably degrades if the power levels of system users are not equal or approximately equal. Interference from high powered signals degrades the performance of faded signals. This effect is known as the near-far problem.

In principle, the signal level of the active users can be maintained to a desired level by efficient and fast power control schemes (e.g., a combination of open loop and closed loop methods). However, when a satellite channel with a long propagation delay is involved, realization of fast power control methods are not practical.

In traditional single user CDMA receivers, the received signal is correlated with the bandwidth spreading code of the desired channel, and the interference from other users is considered as additional thermal noise. Data then is detected by comparing the output of the correlator with a threshold. In a single user receiver, no attempt is made to reduce the interference from other users.

A potentially attractive technique for increasing the capacity of direct sequence spread spectrum CDMA has been to employ an efficient and low complexity interference cancellation method which takes advantage of the deterministic nature of interference noise. In this approach, the desired signal is detected by jointly processing the signal of every active user in each receiver.

FIG. 1 is a block diagram of a typical decorrelator detector for a joint CDMA receiver. In such a joint CDMA receiver, the desired signal is detected by processing the output of a bank of correlators, 1-K, implemented in a serial or parallel configuration, each corresponding to one of the active users. This method, while potentially yielding significant improvements in the CDMA channel capacity, requires the availability of bandwidth spreading sequences of the other users at every receive end. Also, it is necessary to obtain a good estimate of every user's instantaneous power level, and to determine the relative time delay/phase of each user, with respect to the desired signal. In principle, interference from other users can be calculated and subtracted from the received signal if all of the information about the transmission channel and the other active users' signals are available at the receiver. This requires tremendous computational capability at receivers. Clearly, not every practical system can meet all of these prerequisites.

The main functions of a typical CDMA Spread Spectrum system can be formulated as follows. For a chip synchronized CDMA system with K active users, let the bandwidth spreading sequence of the ith user be denoted by $s_i(t)$, $t \in \{0,T\}$, of finite energy, and confined to T seconds. Assume that each bandwidth spreading sequence of period L conveys only one data bit, so that T is also the time duration for transmitting one information bit. Then, in a chip synchronous multiple access channel, the received signal over the time interval $0 \leq t \leq T$ is $$r(t) = \sum_{i=1}^{K} \alpha_i d_i s_i(t) + n(t)$$

where, $d_i = \pm 1$ and $\alpha_i$ denote, respectively, the information bit and signal power level of the ith user, and $n(t)$ is additive white Gaussian noise. The above equation represents an ideal CDMA channel model for the received signal of the first information bit (from K users) where perfect chip timing, carrier center frequency, and phase adjustment among users are assumed. Each received chip has a rectangular pulse shape.

Referring again to FIG. 1, the received composite signal, $r(t)$, is correlated by bandwidth spreading sequences $s_j(t)$, $1 \leq j \leq K$.

The output, $c_j$, of the jth correlator is $$c_j = \int_0^T s_j(t)r(t)dt = \sum_{i=1}^{K} \alpha_i d_i \theta_{ji} + n_j, \quad 1 \leq j \leq K \quad (1)$$

where, $$\theta_{ij} = \int_0^T s_i(t)s_j(t)dt,$$

is crosscorrelation between sequence $s_i(t)$ and $s_j(t)$, and $$n_j = \int_0^T s_j(t)n(t)dt$$

is a sample of correlated noise.

In matrix form, equation (1) can be written as $$C = RA + n$$

where $C^T = [c_1, c_2, \ldots, c_k]$, $A^T = [d_1, d_2, \ldots, d_k]$, $n^T = [n_1, n_2, \ldots, n_k]$, and R is a K by K matrix with elements $\alpha_i \theta_{ij}$.

In the absence of noise, $C = RA$, and if R is invertible, estimates for information bits are readily obtained by premultiplying C by the inverse crosscorrelation matrix, $W = R^{-1}$. This interference cancellation method, known as the decorrelating detector method, is one of the first techniques devised and published for increasing the capacity of direct sequence CDMA systems. However, it is a suboptimum procedure, because the noise term in equation (1) is correlated. Also, from a practical point of view, its implementation is not straightforward. The inverse of R can be calculated only if the received power levels of all the K active users, $\alpha_i$, $1 \leq i \leq K$, are known with a fair amount of accuracy. Moreover, the number of active users and the corresponding bandwidth spreading sequences must be known at the receive end. Thus, the complexity of implementation of an optimum interference cancellation method based on the decorrelating detector concept increases exponentially with respect to the number of active users. Additionally, several known interference cancellation techniques are useful and effective only when the interference noise is substantially greater than the thermal noise.

SUMMARY OF THE INVENTION

It is an object of the present invention to provide a simple and efficient CDMA interference cancellation method which significantly improves the link capacity.

It is a further object of the invention to provide an interference cancellation method, which requires only two correlators in a receiver, no matter how many users are active.

It is another object of the invention to provide an interference cancellation method which does not require power level measurements of other users, and is effective at low as well as high signal to noise density ratios (SNR).

Briefly, the present invention accomplishes these and other objectives by generating a reference sequence which is representative of the spreading sequences of all other users in the system. By correlating the received signal with the reference sequence, the present invention removes interference without requiring a correlation and power estimate for each system user.

The inventive scheme can be applied to a direct sequence CDMA system which meets the following conditions:

1) Chip synchronization. While this condition can be difficult to realize in several channel environments of practical interest, it is a valid assumption for the outbound link (central station to remotes) where data are encoded by users' signature sequences and transmitted simultaneously. Chip synchronization also can be maintained within the desired level if data are transmitted to remotes from different earth stations.

2) Constant crosscorrelation. Crosscorrelation between any pair of bandwidth spreading codes, $s_i(t)$ and $s_j(t)$, denoted by $\theta_{ij}$ is a constant, $$\theta_{ij} = \theta \quad 1 \leq i,j \leq K, \ i \neq j$$

where K is the maximum number of active users. Examples of such bandwidth spreading codes are orthogonal Walsh functions for which $\theta = 0$, shifted versions of PN sequence, and Massey's preferred phase Gold codes where for a sequence of period L, $\theta = -1/L$.

3) Reference sequence. There exists a reference sequence, $s_r(t)$, so that its crosscorrelation, $\theta_{ri}$, with every bandwidth spreading sequence used in the system, $s_i(t)$, is a constant, $$\theta_{ri} = \Theta, \quad 1 \leq i \leq K.$$

Trivially, one of the sequences, in the set of shifted versions of a PN sequence, can be selected as the reference sequence, since crosscorrelation between any pair of sequences in this set is $-1/L$. Nontrivial and useful reference sequences will be described in detail below.

4) Unbalanced power level. Users' signals are received with different power levels, not known a priori at the receive end.

5) Slow fading. Received power level of users' signals is almost constant during one data bit, $T = LT_c$, where $T_c$ is the chip duration and L is known as the processing gain.

6) Implementation after despreading is digital.

The above assumptions, while imposing rigorous requirements on the transmit site and the bandwidth spreading sequences, might look contradictory and inconsistent. For example, interference cancellation does not seem to be necessary when using orthogonal codes. Also, for the uplink of the forward (hub to remote) direction of a satellite channel, fairly accurate power control can be achieved at the earth stations by using open or closed-loop techniques. In the downlink, all the signals are degraded simultaneously and equivalently. Therefore, the near-far effect would not seem to exist.

However, the need for interference cancellation in a CDMA system is justified by noting that in the forward direction, a remote (mobile or VSAT) user might be in deep fade (Ku-band or K band) and the forward message must be transmitted with a substantially higher power level than that of the other active users. The relatively large transmitted power causes considerable interference with the other users' signals. Also, in a variable bit rate CDMA network, a larger power level must be allocated to users with a higher data rate. Interference from other users exists even in a chip synchronized CDMA system using orthogonal codes at the transmit site since, at the receive end, the users' signals are deorthogonalized by the radio channel. A set of codes will be orthogonal when transmitted over an ideal channel using rectangular pulses. Over a real channel, impaired by ISI, timing offset, and other link distortions, the received signals are not orthogonal. By definition, a CDMA system cannot be free from interference from other users.

BRIEF DESCRIPTION OF THE DRAWINGS

The present invention will be more clearly understood from the following description in conjunction with the accompanying drawings, wherein.

DETAILED DESCRIPTION OF THE PREFERRED EMBODIMENT

Figure 1:
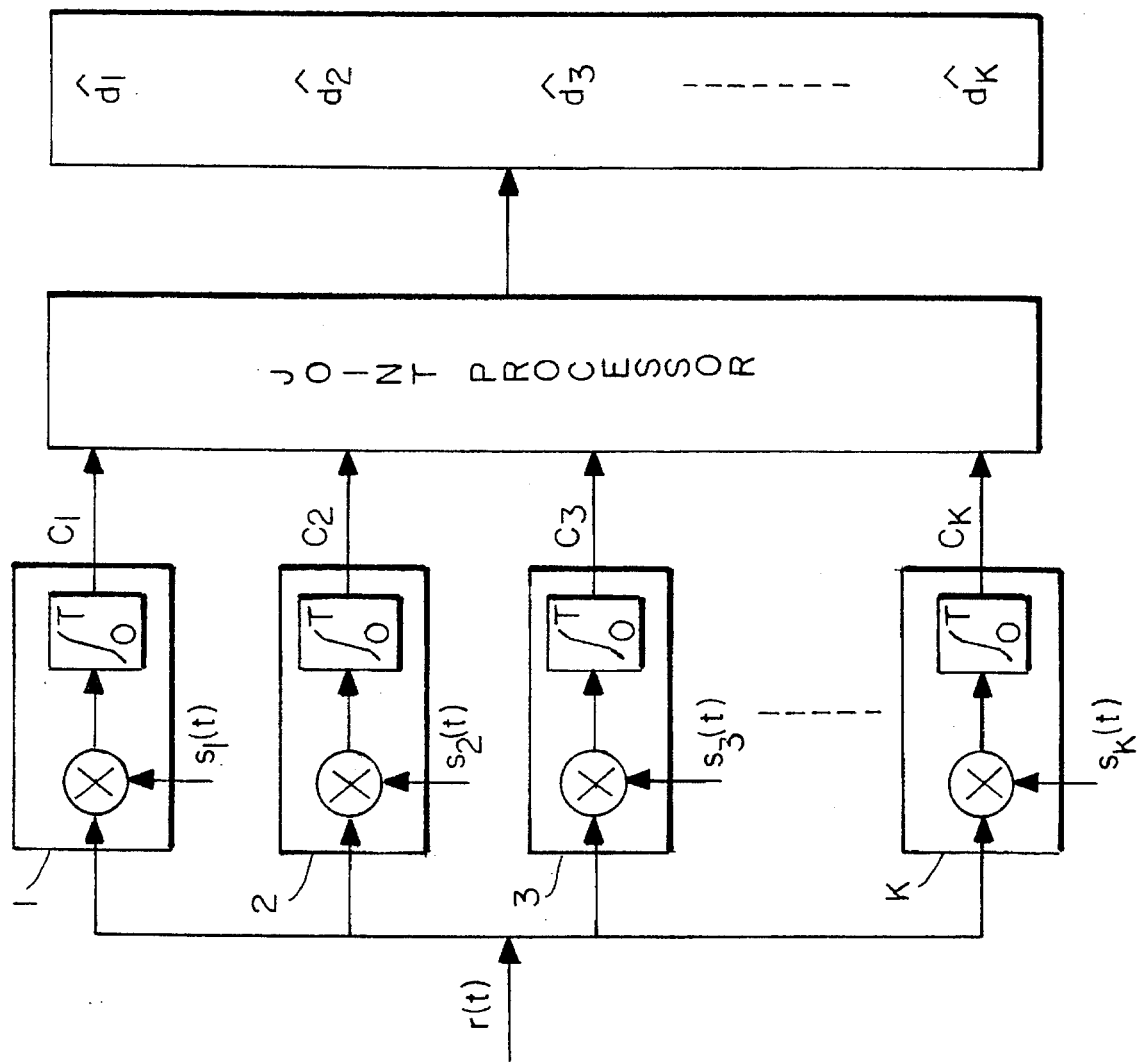
FIG. 1 is a block diagram of a conventional decorrelator detector.
Figure 2:
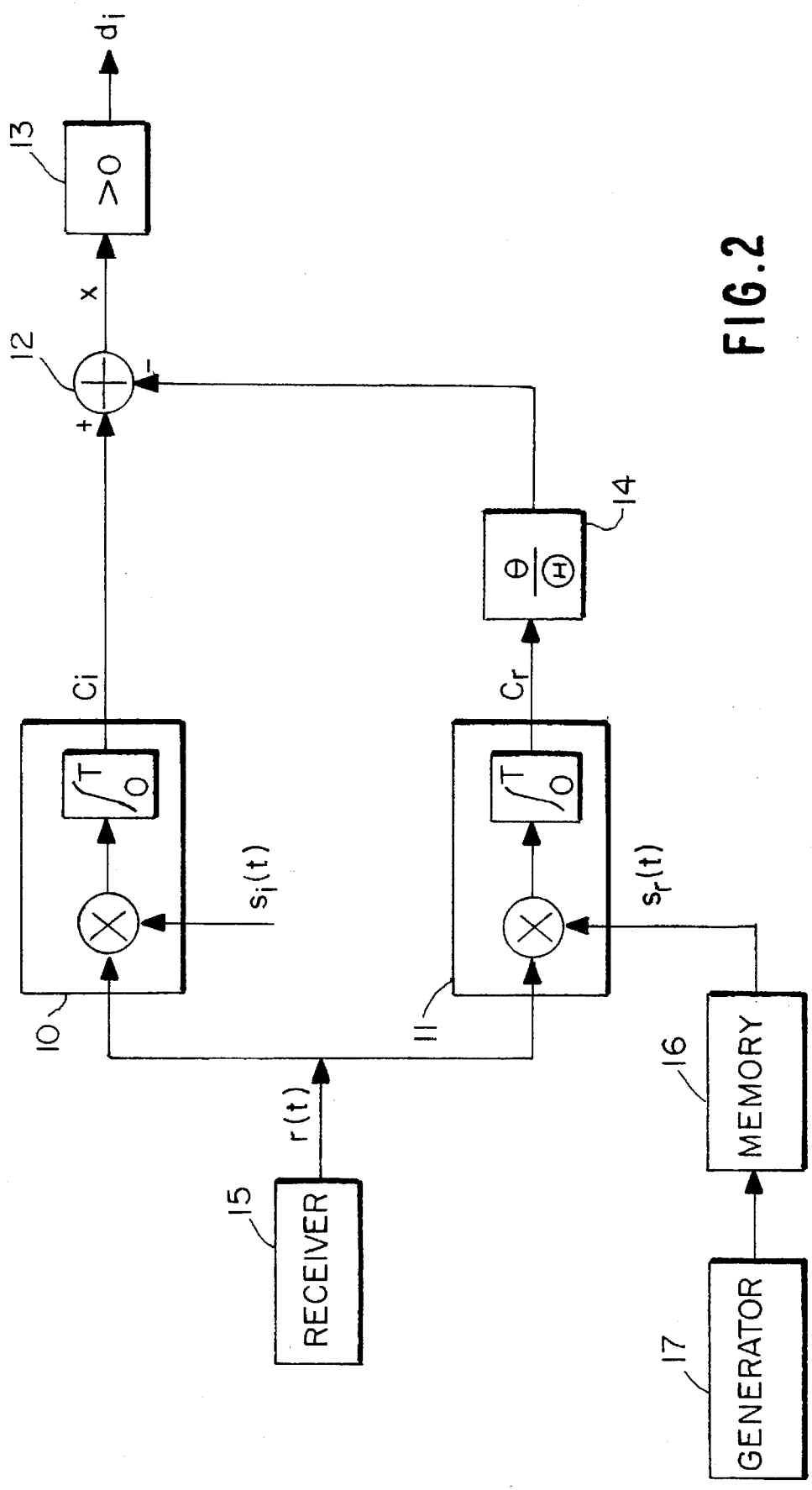
FIG. 2 is a block diagram of a decorrelator detector according to one embodiment of the present invention.

The configuration of the inventive interference cancellation technique is shown in FIG. 2. The bandwidth spreading codes and the reference sequences are believed to meet the requirements and conditions itemized above.

In operation, the received signal r(t) is correlated with the desired user's bandwidth spreading sequence $s_i(t)$ in correlator 10, and with a reference sequence $s_r(t)$ in correlator 11. The reference sequence $s_r(t)$ is representative of the spreading sequences of all other users in the system, and is generated by generator 17, which can be located in each user's receiver, or at a central location. In the latter case, the reference sequence $s_r(t)$ is subsequently stored in each user's receiver. The generation and processing of each signal is described in detail below.

The output of the first correlator 10 is under the summation represent aggregate interference from other users.

Substituting $\theta_{ji}$ by $\theta$ yields $$c_i = \alpha_i d_i + \theta \sum_{\substack{j=1 \\ j \neq i}}^{K} \alpha_j d_j + n_i \tag{3}$$

The output of the second (reference) correlator 11 is $$c_r = \int_0^T s_r(t)r(t)dt = \sum_{j=1}^{k} \alpha_j d_j \theta_{jr} + n_r \tag{4}$$

Substituting $\theta_{ji}$ by $\Theta$ and explicitly illustrating the interference component of the ith user results in $$c_i = \alpha_i d_i \Theta + \Theta \sum_{\substack{j=1 \\ j \neq i}}^{K} \alpha_j d_j + n_r. \tag{5}$$

Attenuator 14 multiplies $c_r$ by $$\left| \frac{\theta}{\Theta} \right|,$$

and the interference terms in $c_i$ then are cancelled in combiner 12, by eliminating the interference terms in equations (3) and (5). As a result, the output $\chi$ of the combiner 12 may be represented as follows $$\chi = c_i - \frac{\theta}{\Theta} c = \alpha_i d_i \left(1 - \frac{\theta}{\Theta}\right) + \left(n_i - \frac{\theta}{\Theta} n_r\right) \tag{6}$$

Finally, the threshold detector 13 makes a decision about the transmitted bit of the ith user, $d_i$, $\hat{d}_i = 1$ *if* $\chi \geq 0$ $\hat{d}_i = -1$ *Otherwise*

The inventive interference cancellation scheme is effective if $$\left| \frac{\theta}{\Theta} \right| \ll 1.$$

Otherwise, the variance of the noise term $$\left( n_i - \frac{\theta}{\Theta} n_r \right)$$

will be much larger than the variance of the white noise, n(t). As an example, for random bandwidth spreading sequences, noise will be amplified by about 3 dB when $$\left| \frac{\theta}{\Theta} \right| = 1.$$

A simple, but rough, calculation shows that noise is amplified by 0.46 dB when $$\left| \frac{\theta}{\Theta} \right| = 1/3,$$

and 0.17 dB when $$\left| \frac{\theta}{\Theta} \right| = 1/5.$$

The noise amplification factor is negligible when $$\left| \frac{\theta}{\Theta} \right| \leq 1/7.$$

In one embodiment of the present invention, a set of bandwidth spreading codes and the reference code is constructed as follows. Consider the set of PN codes of period $L=2^m-1$ generated by a linear feedback shift register with characteristic polynomial g(x), where g(x) is a binary primitive polynomial of degree m. The set of $2^m-1$ PN sequences, generated by g(x), are cyclic shifts of each other and along with the all zero sequence constitute a maximal length code of length $2^m-1$.

It is well known that the crosscorrelation between any two codewords in a maximal length sequence is $-1$, where, by using the following transformation, a 0 is mapped to 1 and a 1 is mapped to $-1$.

$$A = -1^a$$

Therefore, the set of PN sequences meets the first condition for having constant crosscorrelation among all bandwidth spreading sequences, $\theta_{ij} = \theta$ for all $1 \leq i,j \leq K$, $i \neq j$.

The reference sequence, $s_r(t)$, is constructed by using properties of the generator matrix for maximal length codes. Let G be the generator matrix for a maximal length code, C=(L, m, d), of length L, dimension m, and minimum distance $d=2^{m-1}$. It is well known that G is also the parity check matrix for a Hamming code of length L, dimension $2^m-1-m$, and minimum distance 3. Columns of the parity check matrix for Hamming codes, or equivalently, the generator matrix for a maximal length code, include all the $2^m-1$ nonzero binary m-tuples. Let $G_e$ be obtained by expurgating e dimensions (deleting e rows) of G. Then, there are $2^e-1$ all zero columns in $G_e$. Similarly, for each nonzero binary (m-e)-tuple there are $2^e$ identical columns in $G_e$. This property follows from the structure of binary (m-e)-tuples.

Let F be the set of locations for the all zero columns in $G_e$. Then, a code $C_e$, generated by $G_e$, has $2^e-1$ zeros at the locations identified by Γ. This property immediately follows from the linearity property of the code generated by $G_e$. Before proceeding to introduce a method for constructing the reference sequence $s_r(t)$, the above observations may be verified through the following example.

Example: Let m=4, $g(x)=1+x^3+x^4$, L=15, and e=2. Then, G is

| 0 | 1 | 0 | 1 | 1 | 0 | 0 | 1 | 0 | 0 | 0 | 1 | 1 | 1 | 1 |
|---|---|---|---|---|---|---|---|---|---|---|---|---|---|---|
| 1 | 0 | 1 | 0 | 1 | 1 | 0 | 0 | 1 | 0 | 0 | 0 | 1 | 1 | 1 |
| 1 | 1 | 0 | 1 | 0 | 1 | 1 | 0 | 0 | 1 | 0 | 0 | 0 | 1 | 1 |
| 1 | 1 | 1 | 0 | 1 | 0 | 1 | 1 | 0 | 0 | 1 | 0 | 0 | 0 | 1 | where its columns include all of the nonzero binary 4-tuples. Next, expurgating the last two rows yields $G_e$,

| 0 | 1 | 0 | 1 | 1 | 0 | 0 | 1 | 0 | 0 | 0 | 1 | 1 | 1 | 1 |
|---|---|---|---|---|---|---|---|---|---|---|---|---|---|---|
| 1 | 0 | 1 | 0 | 1 | 1 | 0 | 0 | 1 | 0 | 0 | 0 | 1 | 1 | 1 | which includes $2^e-1=3$ all zero columns in locations 7, 10, and 11; therefore, Γ={7,10,11}. The code, $C_e$, generated by $G_e$, has $2^{m-e}=4$ codewords, including the all zero codeword,

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 1 | 0 | 1 | 1 | 0 | 0 | 1 | 0 | 0 | 0 | 1 | 1 | 1 | 1 |
| 1 | 0 | 1 | 0 | 1 | 1 | 0 | 0 | 1 | 0 | 0 | 0 | 1 | 1 | 1 |
| 1 | 1 | 1 | 1 | 0 | 1 | 0 | 1 | 1 | 0 | 0 | 1 | 0 | 0 | 0 | with a zero at locations Γ={7,10,11}.

The following construction technique is one of the many possible methods for generating the desired bandwidth spreading sequences. This method, which is based on the above observations, yields a set of $2^{m-e}-1$ nonzero sequences of period $L=2^m-1$ with θ=−1 and a reference sequence, $s_r(t)$, with Θ=$-2^{e+1}+1$.

GENERATION OF THE DESIRED BANDWIDTH SPREADING SEQUENCES:

1) Construct the generator matrix G for a maximal length code.
2) Expurgate e rows of G for obtaining $G_e$.
3) Choose the $2^{m-e}-1$ nonzero codewords, generated by $G_e$, as the bandwidth spreading codes.

GENERATION OF THE REFERENCE SEQUENCE:

1) Identify the set Γ, the $2^e-1$ locations for all zero columns in $G_e$.
2) In a block of length $L=2^m-1$, set locations identified by Γ to 1.
3) Set the remaining $2^m-2^e$ locations to 0.

After the 0 to 1 and 1 to −1 transformation, crosscorrelation of the reference sequence and all the $2^{m-e}-1$ PN sequences generated by the above procedure is $$Θ=L-2d'=2^m-1-2(2^3-1+2^{m-1})=-2^{e+1}+1$$

where $$d'=2^3-1+2^{m-1}$$

is the Hamming distance between $s_r(t)$ and the set of $2^{m-e}-1$ generated PN sequences. The above equation d' is obtained from the fact that every period of a PN sequence consists of $2^{m-1}$ ones and $2^{m-1}-1$ zeros.

Continuing with the above example, $s_r(t)$ is 0 0 0 0 0 0 1 0 0 1 1 0 0 0 0 with ones at locations Γ={7,10,11} and zeros elsewhere. $s_r(t)$ is at a Hamming distance of d'=11 from the set of three PN sequences of period L=15,

| 0 | 1 | 0 | 1 | 1 | 0 | 0 | 1 | 0 | 0 | 0 | 1 | 1 | 1 | 1 |
|---|---|---|---|---|---|---|---|---|---|---|---|---|---|---|
| 1 | 0 | 1 | 0 | 1 | 1 | 0 | 0 | 1 | 0 | 0 | 0 | 1 | 1 | 1 |
| 1 | 1 | 1 | 1 | 0 | 1 | 0 | 1 | 1 | 0 | 0 | 1 | 0 | 0 | 0 | and its crosscorrelation with these sequences is exactly 15−2×11=−7.

Clearly, there is a tradeoff between the number of generated PN sequences, $K=2^{m-e}-1$, and $Θ=-2^{e+1}+1$. Small sets have a large reference crosscorrelation, Θ. Desired PN sequences of period L=7, 15, and 31, along with their reference sequences are listed in Tables 1–3.

Performance of the interference cancellation method has been examined by computer simulation, in accordance with which the inventive technique appears to be effective against unbalanced power level of users and its sensitivity to imperfect user-timing in a chip synchronous system distorted by additive white Gaussian noise.

The BER vs $E_b/N_0$ performance curves are shown in FIGS. 3–6 for a direct sequence CDMA system consisting of K=3 active users. The bandwidth spreading sequences are the PN codes of period L=15 shown in Table 2, e=2. The BER performance curves are plotted parametrically in the interference to carrier power ratio, I/C, in dB, defined as the ratio of the power level of each of the other K-1 active users to the received power level of the desired signal.

Figure 3:
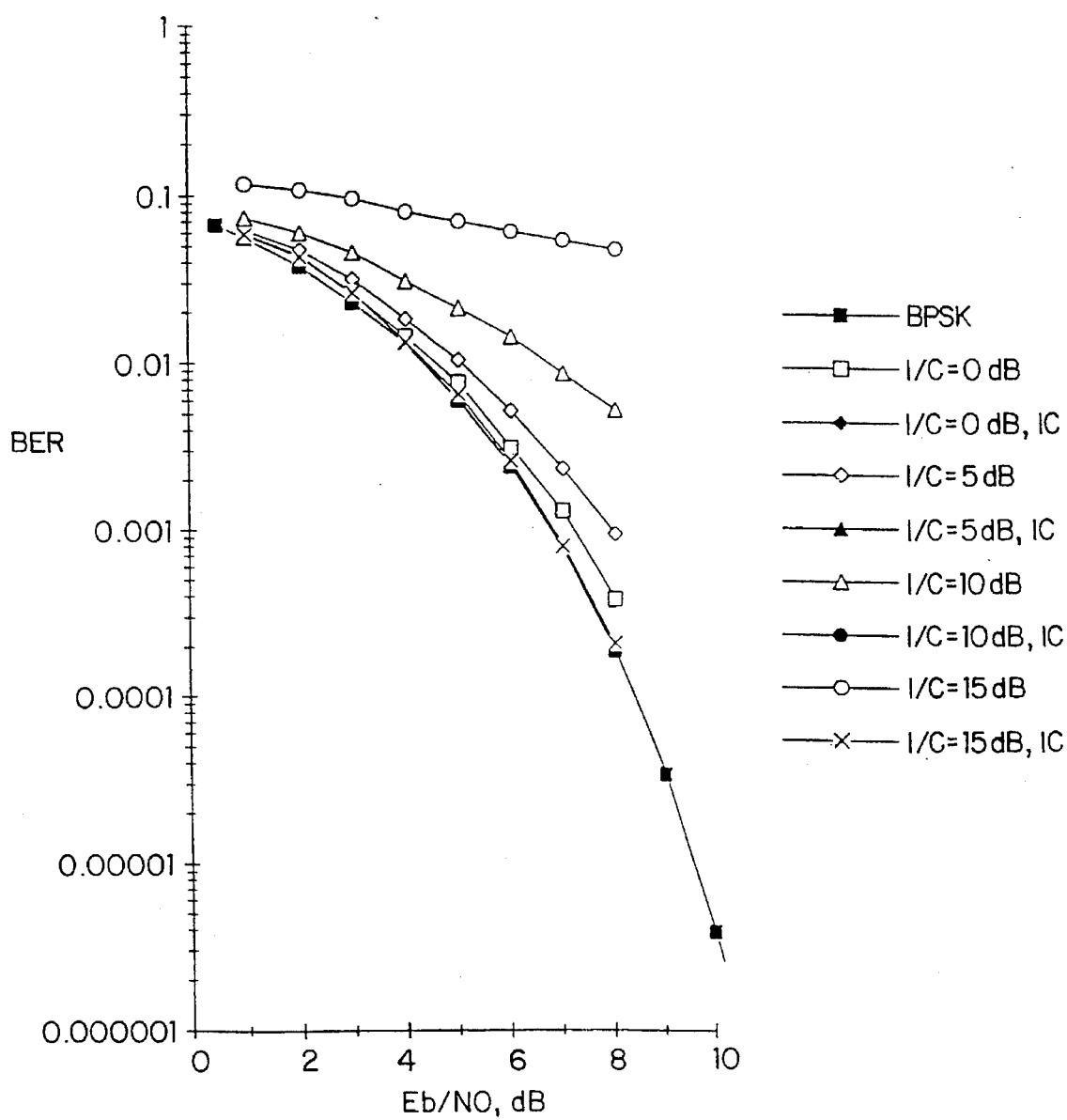
FIG. 3 is a graph of the performance curve for a direct sequence CDMA system where K=3 users and Td=0.
Figure 4:
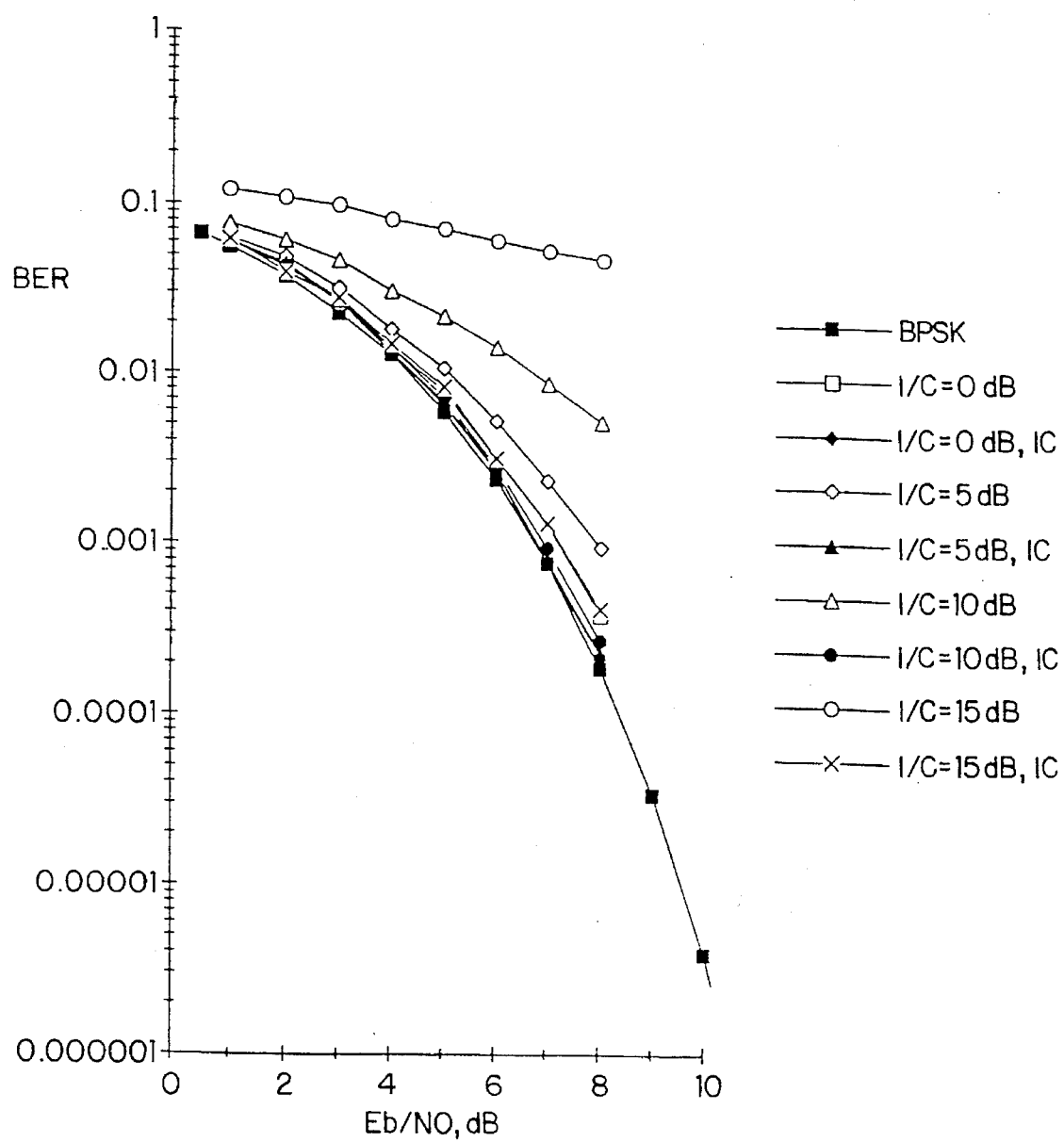
FIG. 4 is a graph of the performance curve for a direct sequence CDMA system where K=3 users and Td=Tc/8.
Figure 5:
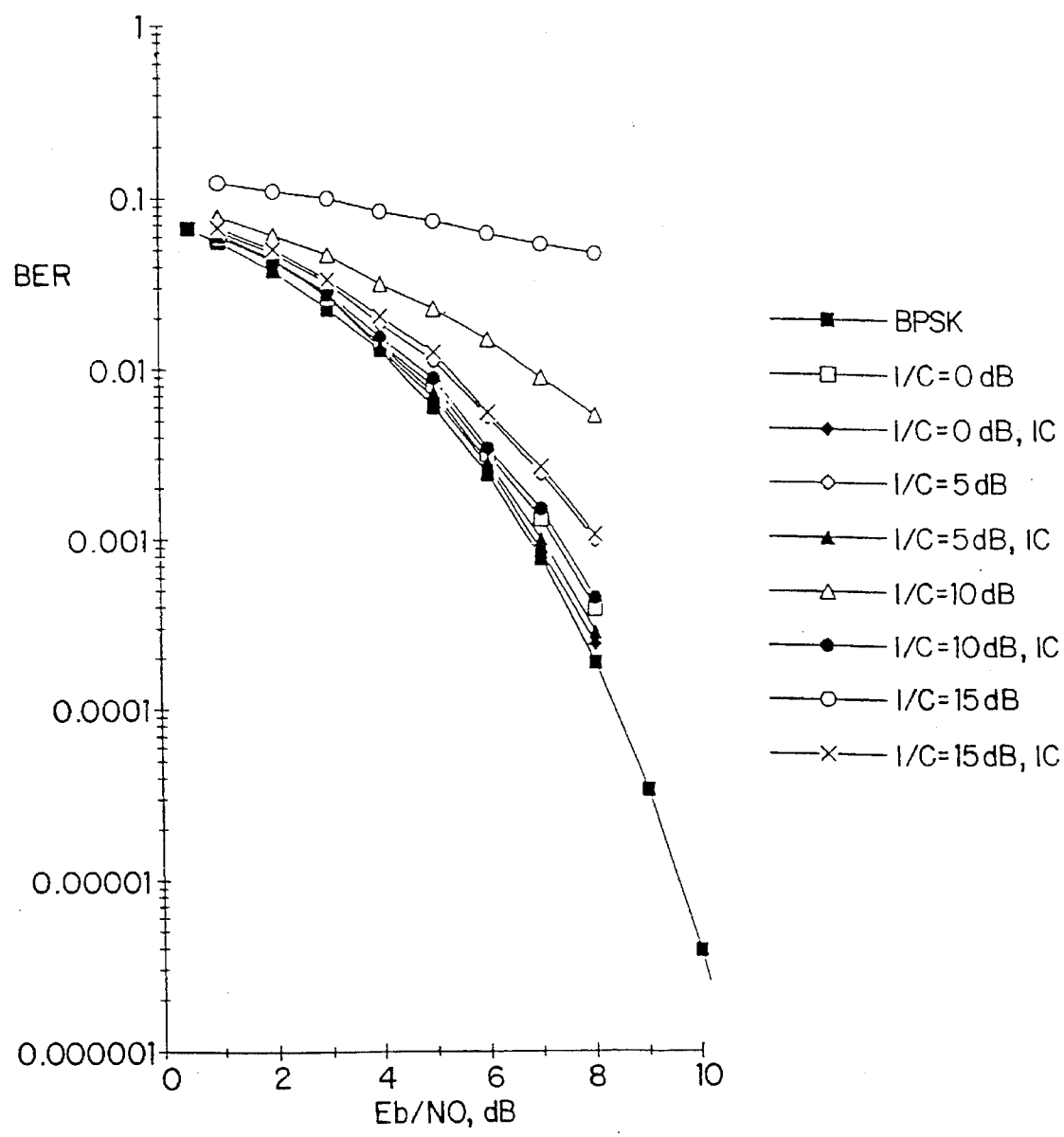
FIG. 5 is a graph of the performance curve for a direct sequence CDMA system where K=3 users and Td=Tc/4.
Figure 6:
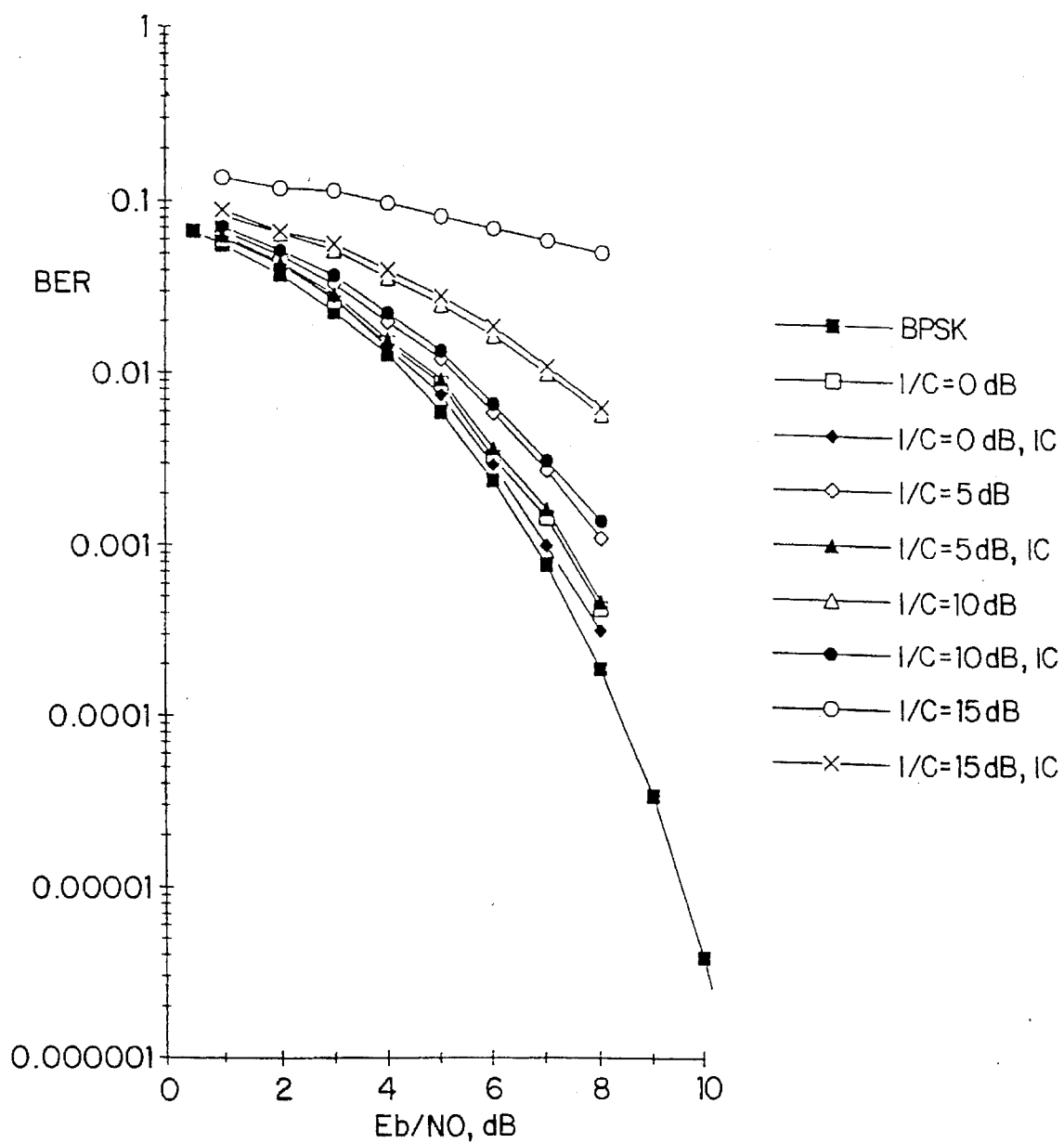
FIG. 6 is a graph of the performance curve for a direct sequence CDMA system where K=3 users and Td=Tc/2.

The BER performance curves shown in FIG. 3 correspond to ideal timing, $T_d=0$, among the 3 active users. The inventive interference cancellation method removes interference from the other two users almost perfectly, even when the signal of the desired user is faded by 15 dB. Close examination of FIGS. 4, 5, and 6, corresponding to $T_d=T_c/8$, $T_c/4$, and $T_c/2$, respectively, reveals that the inventive interference cancellation technique is not sensitive to inaccuracies of the chip synchronization timing when I/C≦10 dB.

Figure 7:
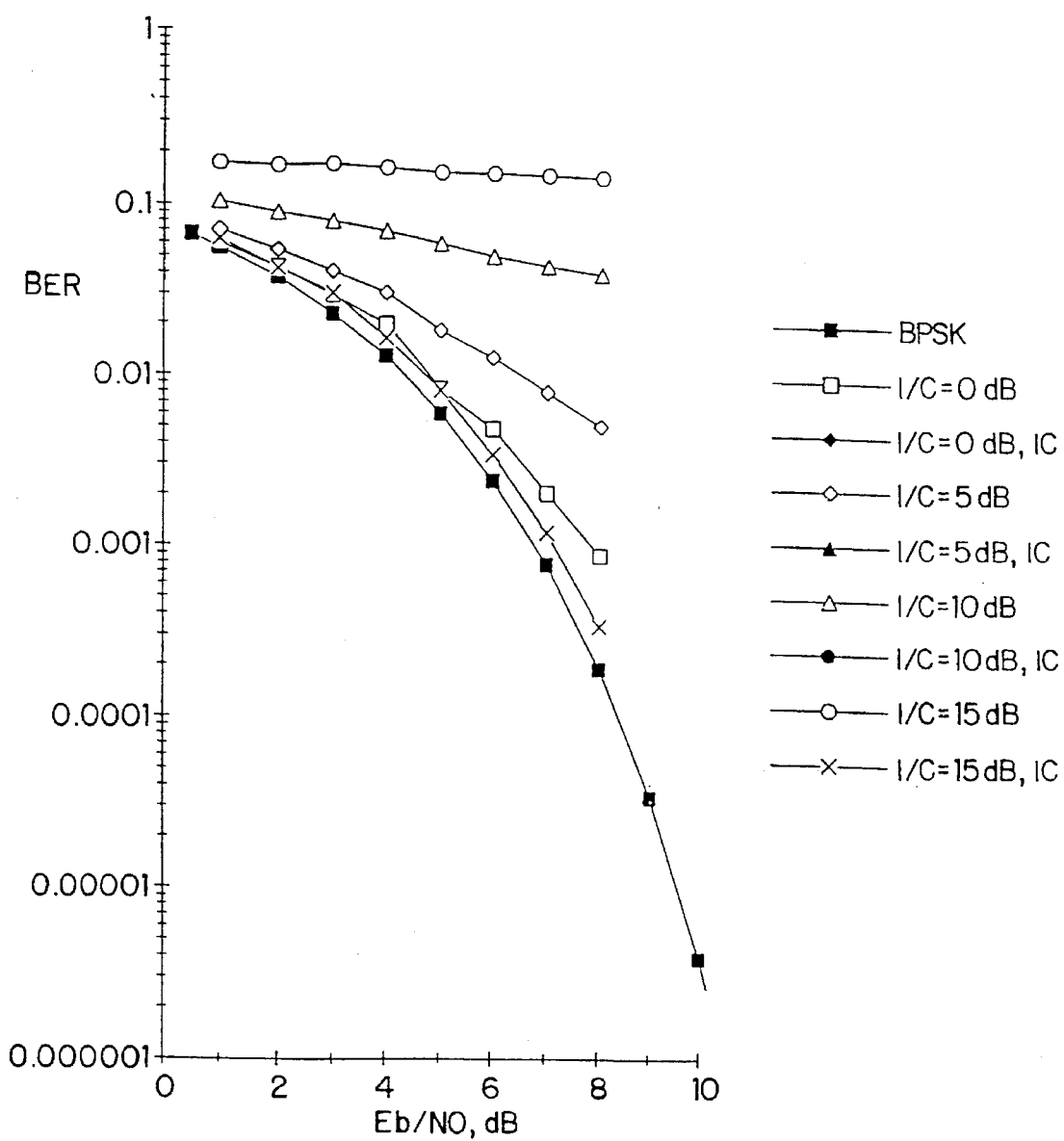
FIG. 7 is a graph of the performance curve for a direct sequence CDMA system where K=7 users and Td=0.
Figure 8:
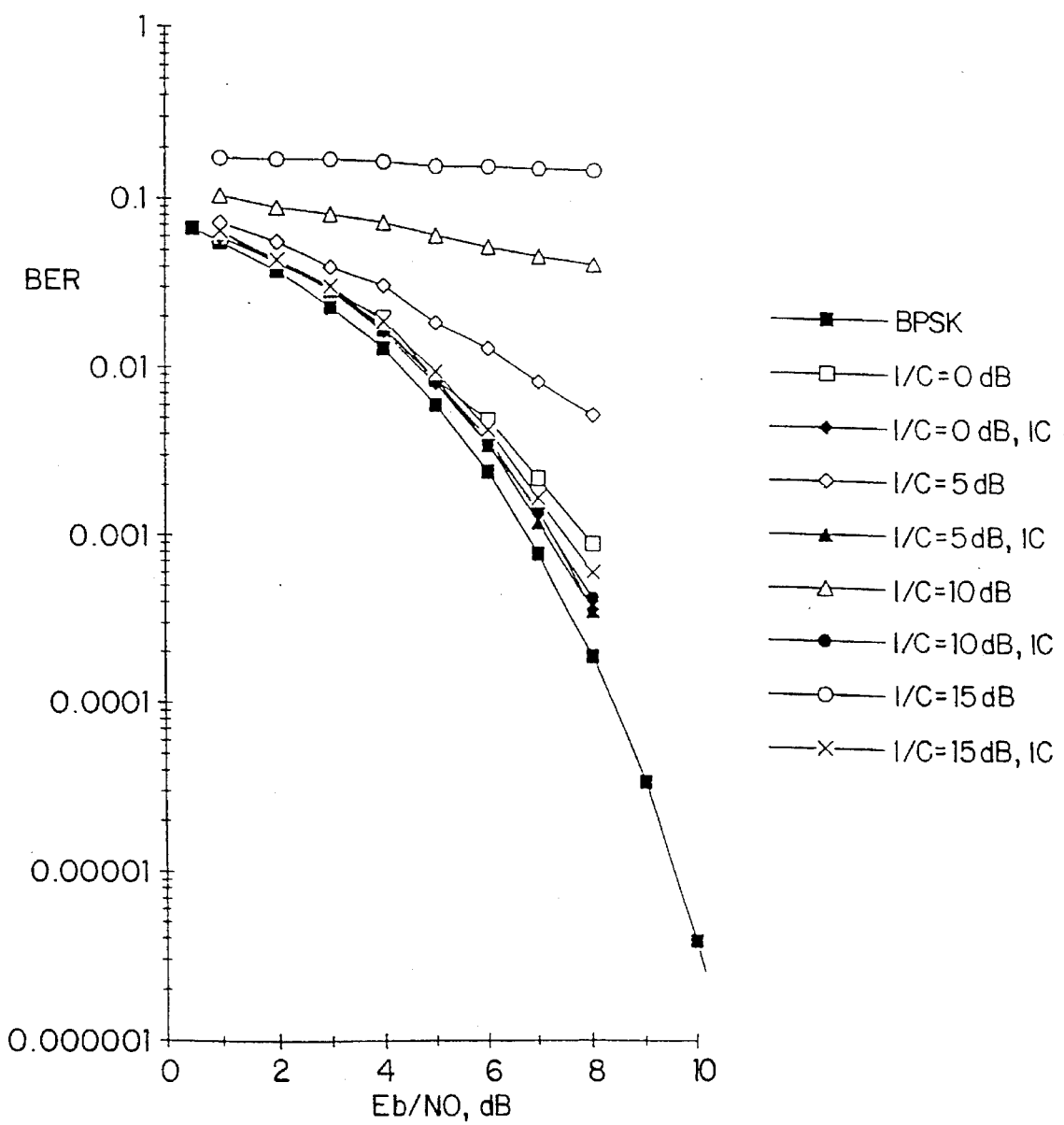
FIG. 8 is a graph of the performance curve for a direct sequence CDMA system where K=7 users and Td=Tc/8.
Figure 9:
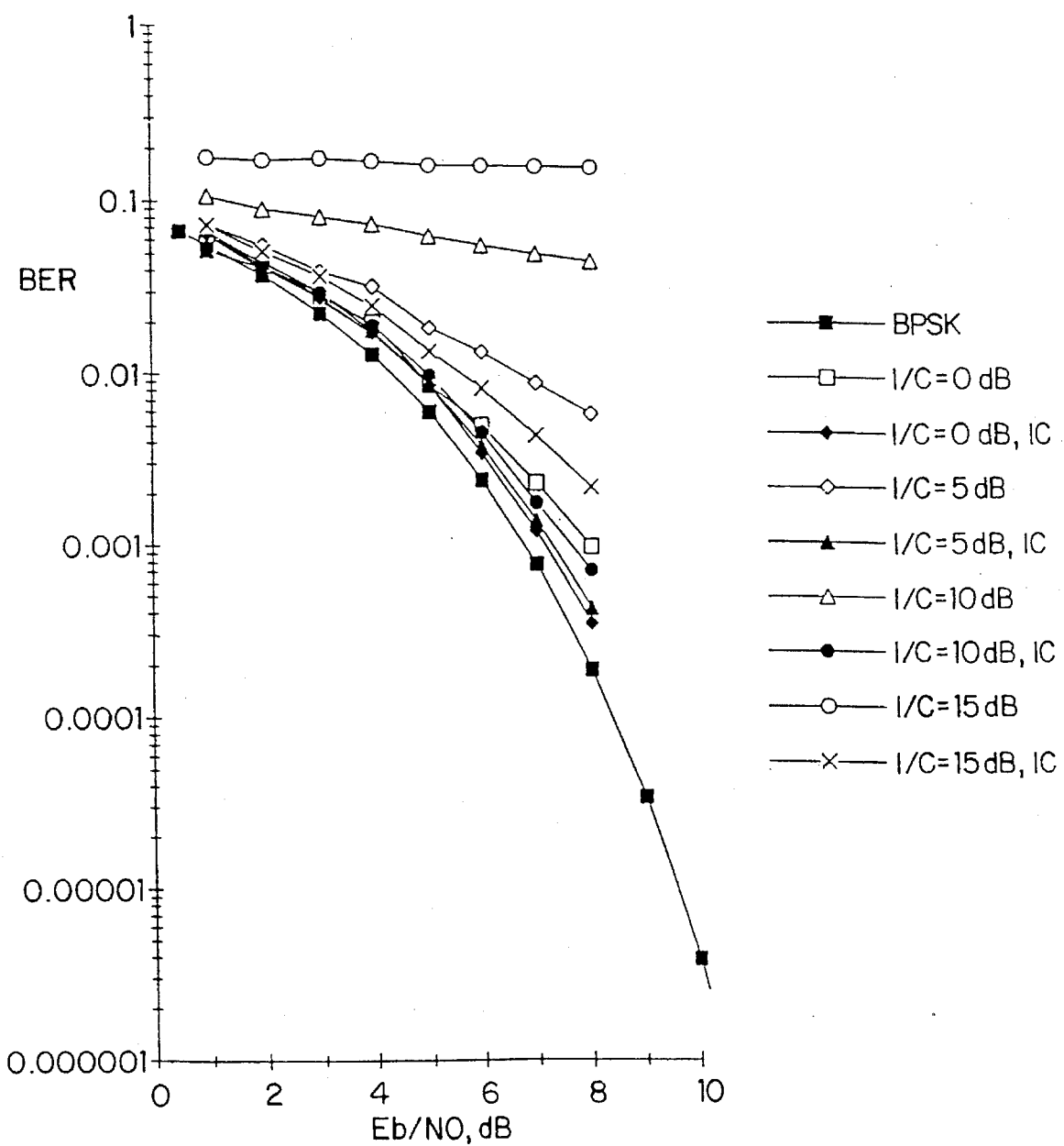
FIG. 9 is a graph of the performance curve for a direct sequence CDMA system where K=7 users and Td=Tc/4.
Figure 10:
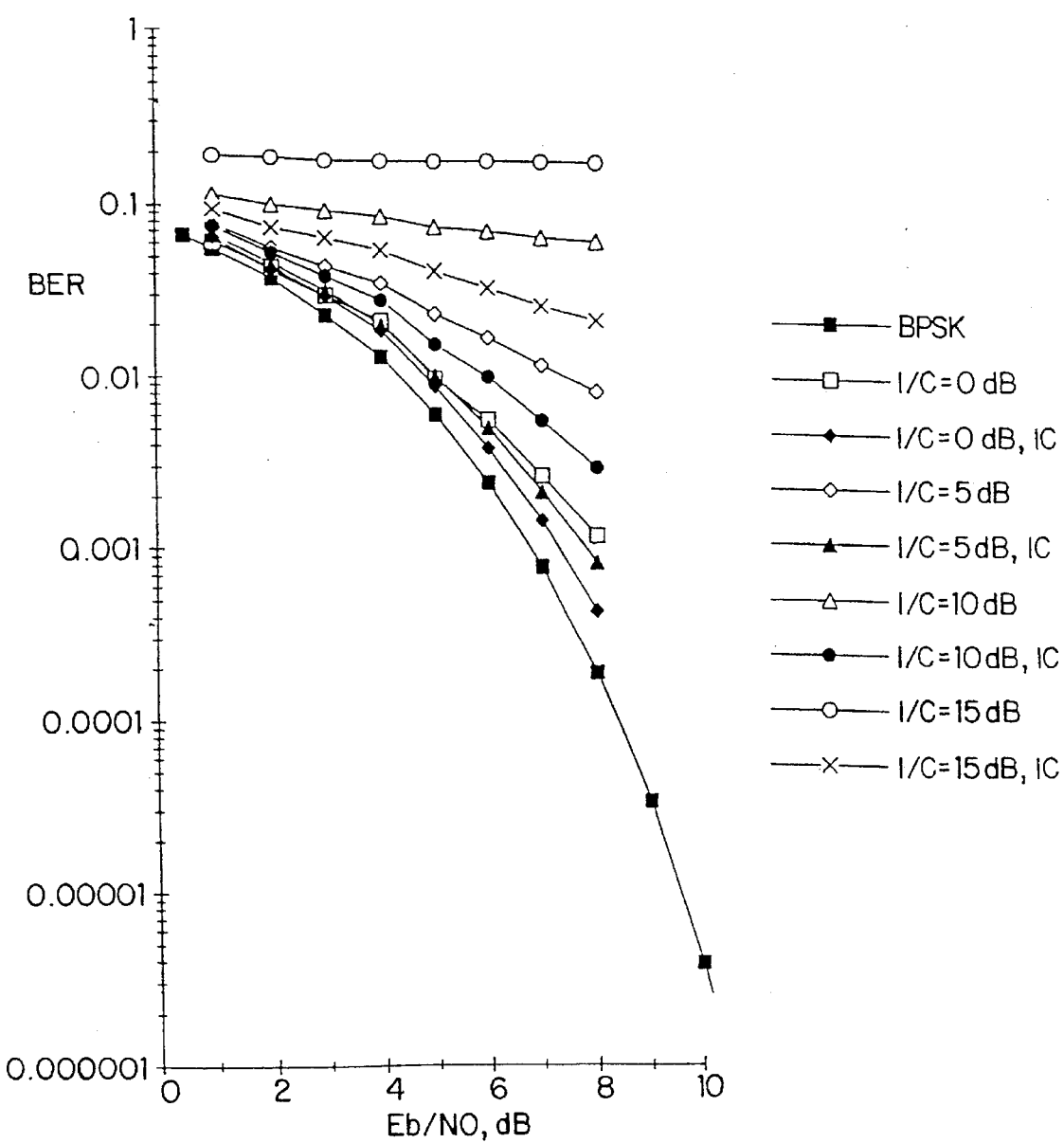
FIG. 10 is a graph of the performance curve for a direct sequence CDMA system where K=7 users and Td=Tc/2.

The curves plotted in FIGS. 7–10 are for a CDMA system consisting of K=7 active users employing PN sequences shown in Table 2, e=1. This is a model of a highly bandwidth efficient CDMA system with an average of 0.466 information bits per chip. As shown in FIG. 7, the inventive method removes almost perfectly the effects of interference when $T_d=0$. However, it exhibits slight degradations in the BER performance as $T_d$ approaches $T_c/2$ and I/C>10 dB.

It should be appreciated that various changes and modifications can be made to the disclosed embodiments without departing from the spirit and scope of the invention as defined and claimed herein.

TABLE 1

| PN Sequences of Period L = 7. | | | | | | |
|---|---|---|---|---|---|---|
| 0 | 0 | 1 | 1 | 1 | 0 | 1 |
| 1 | 0 | 0 | 1 | 1 | 1 | 0 |
| 1 | 0 | 1 | 0 | 0 | 1 | 1 |
| 0 | 1 | 0 | 0 | 0 | 0 | 0 |
| e = 1, K = 3 | | | | | | |

TABLE 2

PN Sequences of Period L = 15.

| | | | | | | | | | | | | | | |
|---|---|---|---|---|---|---|---|---|---|---|---|---|---|---|
| 0 | 1 | 0 | 1 | 1 | 0 | 0 | 1 | 0 | 0 | 0 | 1 | 1 | 1 | 1 |
| 0 | 1 | 1 | 0 | 0 | 1 | 0 | 0 | 0 | 1 | 1 | 1 | 1 | 0 | 1 |
| 0 | 0 | 1 | 0 | 0 | 0 | 1 | 1 | 1 | 1 | 0 | 1 | 0 | 1 | 1 |
| 0 | 1 | 0 | 0 | 0 | 1 | 1 | 1 | 1 | 0 | 1 | 0 | 1 | 1 | 0 |
| 0 | 0 | 0 | 1 | 1 | 1 | 1 | 0 | 1 | 0 | 1 | 1 | 0 | 0 | 1 |
| 0 | 0 | 1 | 1 | 1 | 1 | 0 | 1 | 0 | 1 | 1 | 0 | 0 | 1 | 0 |
| 0 | 1 | 1 | 1 | 1 | 0 | 1 | 0 | 1 | 1 | 0 | 0 | 1 | 0 | 0 |
| 1 | 0 | 0 | 1 | 1 | 0 | 0 | 0 | 0 | 0 | 0 | 0 | 0 | 0 | 0 | e = 1, K = 7

| | | | | | | | | | | | | | | |
|---|---|---|---|---|---|---|---|---|---|---|---|---|---|---|
| 0 | 0 | 1 | 0 | 0 | 0 | 1 | 1 | 1 | 1 | 0 | 1 | 0 | 1 | 1 |
| 0 | 0 | 0 | 1 | 1 | 1 | 1 | 0 | 1 | 0 | 1 | 1 | 0 | 0 | 1 |
| 0 | 0 | 1 | 1 | 1 | 1 | 0 | 1 | 0 | 1 | 1 | 0 | 0 | 1 | 0 |
| 1 | 1 | 0 | 0 | 0 | 0 | 0 | 0 | 0 | 0 | 0 | 1 | 0 | 0 | | e = 2, K = 3

TABLE 3

PN Sequences of Period L = 31.

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 0 | 0 | 0 | 1 | 1 | 1 | 1 | 0 | 0 | 1 | 1 | 0 | 1 | 0 | 0 | 1 | 0 | 0 | 0 | 1 | 0 | 1 | 0 | 1 | 1 | 1 | 0 | 1 | 1 | | |
| 0 | 0 | 1 | 1 | 1 | 1 | 0 | 0 | 1 | 1 | 0 | 1 | 0 | 0 | 1 | 0 | 0 | 0 | 1 | 0 | 1 | 0 | 1 | 1 | 1 | 0 | 1 | 1 | 0 | | |
| 0 | 0 | 1 | 1 | 0 | 1 | 0 | 0 | 1 | 0 | 0 | 0 | 1 | 0 | 1 | 0 | 1 | 1 | 1 | 0 | 1 | 1 | 0 | 0 | 0 | 1 | 1 | 1 | 1 | | |
| 0 | 0 | 1 | 0 | 0 | 0 | 1 | 0 | 1 | 0 | 1 | 1 | 0 | 1 | 1 | 0 | 0 | 0 | 1 | 1 | 1 | 1 | 0 | 0 | 1 | 1 | 0 | 1 | 0 | | |
| 0 | 0 | 0 | 0 | 1 | 0 | 1 | 0 | 1 | 1 | 1 | 0 | 1 | 1 | 0 | 0 | 0 | 1 | 1 | 1 | 1 | 0 | 0 | 1 | 1 | 0 | 1 | 0 | 0 | 1 | |
| 0 | 0 | 0 | 1 | 0 | 1 | 0 | 1 | 1 | 1 | 0 | 1 | 1 | 0 | 0 | 0 | 1 | 1 | 1 | 1 | 0 | 0 | 1 | 1 | 0 | 1 | 0 | 0 | 1 | 0 | |
| 0 | 0 | 1 | 0 | 1 | 0 | 1 | 1 | 1 | 0 | 1 | 1 | 0 | 0 | 0 | 1 | 1 | 1 | 1 | 0 | 0 | 1 | 1 | 0 | 1 | 0 | 0 | 1 | 0 | 0 | |
| 0 | 1 | 0 | 1 | 0 | 1 | 1 | 1 | 0 | 1 | 1 | 0 | 0 | 0 | 1 | 1 | 1 | 1 | 0 | 0 | 1 | 1 | 0 | 1 | 0 | 0 | 1 | 0 | 0 | 0 | |
| 1 | 0 | 1 | 1 | 1 | 0 | 1 | 1 | 0 | 0 | 0 | 1 | 1 | 1 | 1 | 0 | 1 | 0 | 0 | 1 | 0 | 0 | 0 | 0 | 1 | 0 | | | | | |
| 1 | 0 | 1 | 1 | 0 | 0 | 0 | 1 | 1 | 1 | 1 | 0 | 0 | 1 | 1 | 0 | 1 | 0 | 0 | 1 | 0 | 0 | 0 | 1 | 0 | 1 | 0 | 1 | 1 | | |
| 1 | 0 | 0 | 0 | 1 | 1 | 1 | 1 | 0 | 0 | 1 | 1 | 0 | 1 | 0 | 0 | 0 | 0 | 1 | 0 | 1 | 0 | 1 | 1 | 1 | 0 | 1 | | | | |
| 1 | 0 | 0 | 1 | 1 | 0 | 0 | 1 | 0 | 0 | 0 | 1 | 0 | 1 | 1 | 0 | 0 | 0 | 1 | 1 | 1 | 1 | 1 | | | | | | | | |
| 1 | 0 | 1 | 0 | 0 | 1 | 0 | 0 | 0 | 0 | 1 | 0 | 1 | 0 | 1 | 1 | 0 | 0 | 0 | 1 | 1 | 1 | 1 | 0 | 0 | 1 | | | | | |
| 1 | 0 | 0 | 1 | 0 | 0 | 0 | 0 | 1 | 0 | 1 | 0 | 1 | 1 | 1 | 0 | 1 | 1 | 0 | 0 | 1 | 1 | 0 | | | | | | | | |
| 1 | 0 | 0 | 0 | 0 | 1 | 0 | 1 | 0 | 1 | 1 | 1 | 0 | 1 | 1 | 0 | 0 | 0 | 1 | 1 | 1 | 1 | 0 | 0 | 1 | 1 | 0 | 1 | 0 | 0 | |
| 1 | 0 | 1 | 1 | 1 | 0 | 1 | 1 | 0 | 0 | 0 | 1 | 1 | 1 | 1 | 0 | 0 | 1 | 1 | 0 | 1 | 0 | 0 | | | | | | | | |
| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | e = 1, K = 15

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 0 | 0 | 0 | 1 | 1 | 1 | 1 | 0 | 0 | 1 | 0 | 1 | 0 | 0 | 1 | 0 | 0 | 0 | 1 | 0 | 1 | 0 | 1 | 1 | 1 | 0 | 1 | 1 | | | |
| 0 | 0 | 1 | 1 | 1 | 1 | 0 | 0 | 1 | 0 | 1 | 0 | 0 | 1 | 0 | 0 | 0 | 1 | 0 | 1 | 0 | 1 | 1 | 1 | 0 | 1 | 1 | 0 | | | |
| 0 | 0 | 1 | 1 | 0 | 1 | 0 | 0 | 1 | 0 | 0 | 0 | 1 | 0 | 1 | 1 | 0 | 1 | 1 | 0 | 0 | 0 | 1 | 1 | 1 | 1 | | | | | |
| 0 | 0 | 1 | 0 | 0 | 0 | 1 | 0 | 1 | 0 | 1 | 1 | 0 | 1 | 1 | 0 | 0 | 0 | 1 | 1 | 1 | 1 | 0 | 0 | 1 | 1 | 0 | 1 | | | |
| 0 | 0 | 0 | 0 | 1 | 0 | 1 | 0 | 1 | 1 | 0 | 1 | 1 | 0 | 0 | 0 | 1 | 1 | 1 | 1 | 0 | 0 | 1 | 1 | 0 | 1 | 0 | 0 | 1 | | |
| 0 | 0 | 0 | 1 | 0 | 1 | 0 | 1 | 1 | 0 | 1 | 1 | 0 | 0 | 0 | 1 | 1 | 1 | 1 | 0 | 0 | 1 | 1 | 0 | 1 | 0 | 0 | 1 | 0 | | |
| 0 | 0 | 1 | 0 | 1 | 0 | 1 | 1 | 0 | 1 | 1 | 0 | 0 | 0 | 1 | 1 | 1 | 1 | 0 | 0 | 1 | 1 | 0 | 1 | 0 | 0 | 1 | 0 | 0 | | |
| 1 | 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | | e = 2, K = 7

What is claimed is:

1. In a Code Division Multiple Access (CDMA) spread spectrum receiver, apparatus for cancelling interference from other CDMA spread spectrum transmitters, said apparatus comprising:

first correlating means for receiving a composite signal of plural, overlapping spread-coded signals, and applying a first spreading sequence to said composite signal to produce a first output, said first output comprising an intended signal and first interference components;

second correlating means for receiving and decoding said composite signal with a reference sequence whose cross correlation with code sequences of said other CDMA spread spectrum transmitters is substantially a constant and producing a second output with second interference components, said second interference components being substantially equivalent to said first interference components; and combining means for combining said first and second outputs such that said first and second interference components substantially cancel each other and produce a third output representing said intended signal.

2. An apparatus in accordance with claim 1, further comprising:

reference sequence generating means for generating said reference sequence.

3. An apparatus in accordance with claim 1, further comprising signal receiving means for receiving said composite signal of plural, overlapping spread-coded signals.

4. An apparatus in accordance with claim 1, wherein said second correlating means further comprises adjuster means for adjusting the signal level of said second output.

5. An apparatus in accordance with claim 1, further comprising:

decision making means for receiving said third output and producing a first final signal when said third output is less than a predetermined threshold, and a second final signal when said third output is not less said predetermined threshold.

6. A method of cancelling interference from other transmitters in a CDMA spread spectrum receiver, comprising the steps of:

receiving a composite signal of plural, overlapping spread-coded signals;

extracting an intended signal having interference components from said composite signal by applying a first spreading sequence to said composite signal;

decoding said composite signal with a reference sequence whose cross correlation with code sequences of said other CDMA spread spectrum transmitters is substantially a constant, to generate a decoded signal; and combining said intended signal with said decoded signal to substantially cancel said interference components in said intended signal.

7. A method in accordance with claim 6, further comprising the step of:

generating said reference sequence whose cross correlation with code sequences of said other CDMA transmitters is substantially a constant.

8. A method in accordance with claim 6, further comprising the step of:

adjusting the level of said decoded signal before combining said decoded signal with said intended signal.

9. A method of processing a Code Division Multiple Access (CDMA) signal to cancel interference in said CDMA signal from other transmitters in a CDMA spread spectrum receiver, comprising the steps of:

constructing an m row by $L=2^m-1$ column generator matrix G for a maximal length code, where m is a positive integer $\geq 2$;

obtaining a matrix $G_e$ by expurgating e rows of said generator matrix G, where e is an integer, $1<e<m$;

generating nonzero codewords with said matrix $G_e$;

selecting $2^{m-e}-1$ of said nonzero codewords as bandwidth spreading codes;

identifying a set $\Gamma$ of $2^e-1$ locations for any zero columns in $G_e$;

creating a reference sequence of length $L=2^m-1$ wherein locations identified by said set $\Gamma$ are 1, and the remaining $2^m-2^e$ locations are 0; and applying a signal which comprises said reference sequence to said CDMA signal to substantially cancel interference from said other transmitters.

10. A method of processing a Code Division Multiple Access (CDMA) signal as defined in claim 9, wherein said step of applying a signal further comprises the step of generating an estimate for components of said interference in said CDMA signal from said other transmitters.

* * * * *